April 12, 1932.  J. R. HAINES  1,853,268
SWITCH MECHANISM
Filed June 17, 1929    2 Sheets-Sheet 1
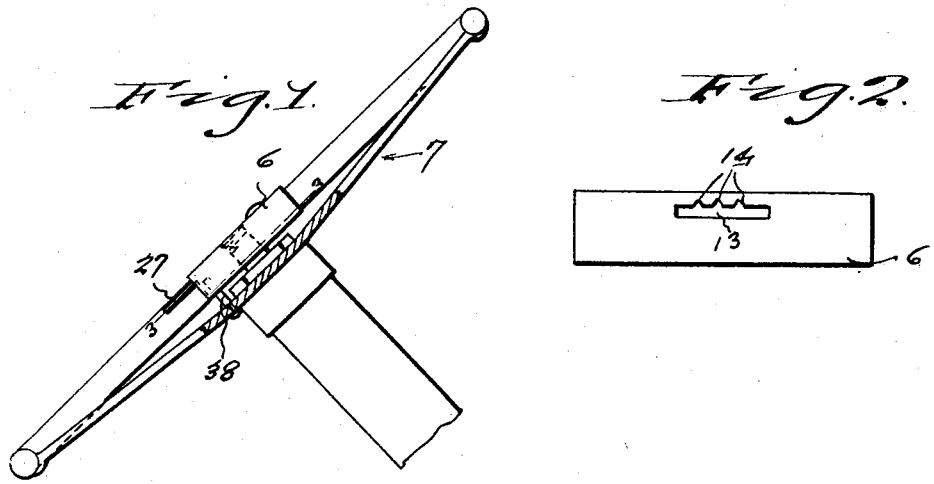
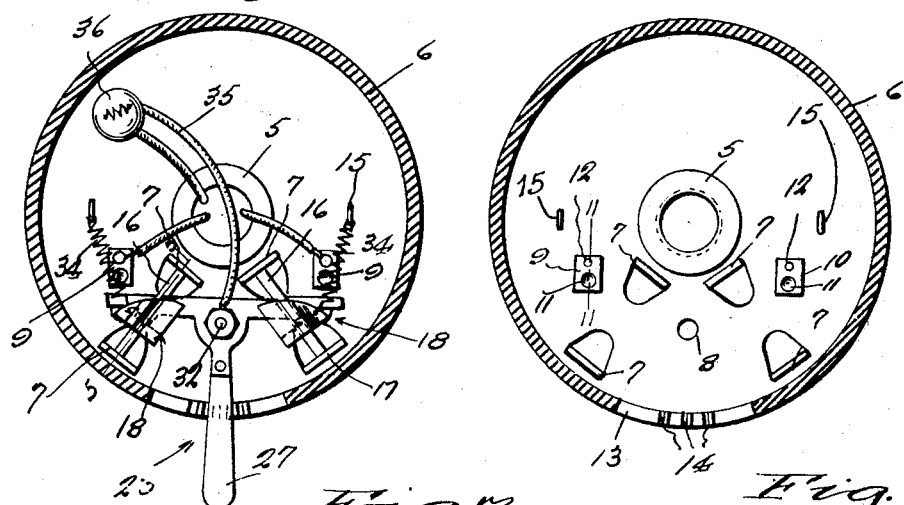
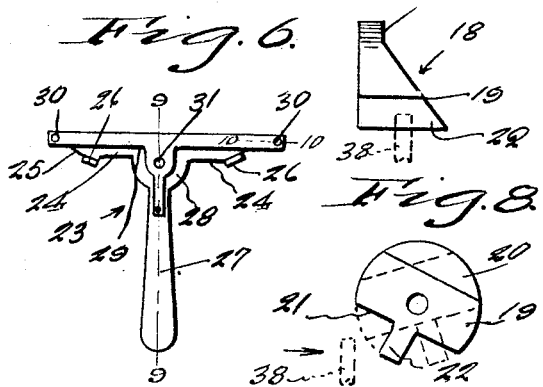
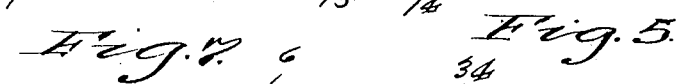
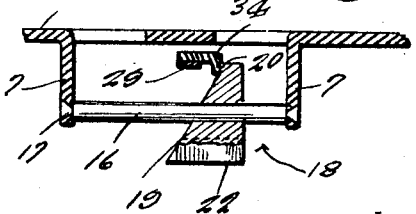
Inventor
John R. Haines
By Clarence A. O'Brien
Attorney April 12, 1932.  J. R. HAINES  1,853,268
SWITCH MECHANISM
Filed June 17, 1929   2 Sheets-Sheet 2
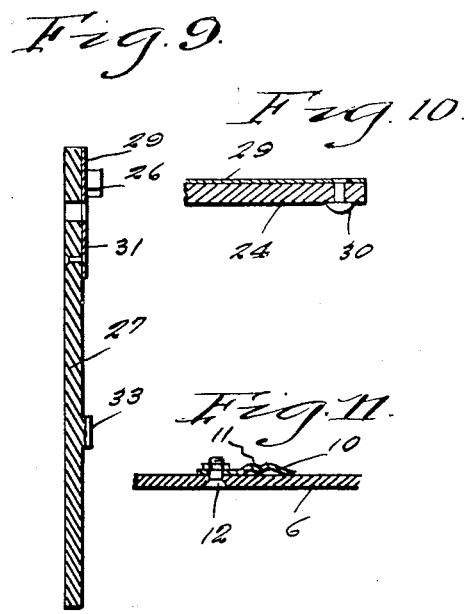
Inventor
John R. Haines
By Clarence A. O'Brien
Attorney Patented Apr. 12, 1932

1,853,268

UNITED STATES PATENT OFFICE

JOHN RALPH HAINES, OF TABERNACLE, NEW JERSEY, ASSIGNOR TO ARROW SAFETY DEVICE COMPANY, INC., OF MOUNT HOLLY, NEW JERSEY, A CORPORATION OF NEW JERSEY

SWITCH MECHANISM

Application filed June 17, 1929. Serial No. 371,643.

This invention appertains to new and useful improvements in circuit makers and breakers and more particularly to a novel switch mechanism especially adapted for use on automobiles in conjunction with direction signals.

More specifically the invention has reference to a switch mechanism, including a circuit closer movable to alternate positions to display predetermined signal matter for a period of time sufficient within which to complete the turn of the vehicle in the direction indicated, whereupon the circuit closer is automatically operated to break the electrical connection to the particular signal.

The primary object of the invention is to provide a switch mechanism which can be operated by the driver of the vehicle, without any inconvenience for closing predetermined circuits or automatically breaking said circuits upon the return of the steering mechanism to normal straight driving position.

Another salient object of the invention is to provide a switch mechanism for automobile direction signals which is adapted to be manually operated to circuit closed position and automatically operated to circuit opened position.

A further object of the invention is to provide a switch mechanism capable of being installed on the steering mechanism of an automobile as an attachment or built in the mechanism during the construction of the vehicle.

These and other important objects of the invention will become more apparent to the reader after considering the invention as described and claimed hereinafter.

In the drawings:

Figure 1 represents a side elevation of the switch mechanism built in the steering mechanism of an automobile, the steering mechanism being shown in fragmentary and partial sectional view.

Figure 2 represents an end elevation of the switch.

Figure 3 represents a sectional view, taken substantially on the line 3—3 of Figure 1.

Figure 4 represents a sectional view, taken on substantially the same line as Figure 3, in Figure 1, but showing various details detached from the switch casing to show the manner of constructing the casing.

Figure 5 represents a fragmentary sectional view, taken substantially on the line 5—5 of Figure 3.

Figure 6 represents a top plan view of the control lever.

Figure 7 represents a side elevation of one of the cam members.

Figure 8 represents a front elevation of one of the cam members and showing in dotted lines the extreme inverse position.

Figure 9 represents a longitudinal sectional view through the control lever, the same being taken substantially on the line 9—9 of Figure 6.

Figure 10 represents a fragmentary sectional view, taken substantially on the line 10—10 of Figure 6.

Figure 11 represents a fragmentary sectional view, taken substantially on the line 11—11 of Figure 4.

Referring to the drawings wherein like numerals designate like parts, it will be seen that the form of the invention disclosed in Figures 1 to 11 inclusive is to be built in the steering mechanism of the automobile, during the construction of the latter. To this extent, the steering column has a hub 5 which extends into the circular casing 6 at a point above the upper end of the steering column and on a plane substantially flush with the planer disposition of the steering wheel generally referred to by numeral 7. The bottom of the casing 6 is struck out to provide two spaced pairs of opposed ears 7, and between these pairs of ears 7 is provided an opening 8. At opposite sides of the innermost ears 7 are the contacts 9 and 10, each of which is provided with a depression 11, and means 12 for securing the same to the bottom of the casing.

At a point intermediate the pairs of ears 7, the side wall of the casing is provided with an elongated opening 13, the upper edge of which is provided with three notches 14. Lugs 15 are provided adjacent the contact plates 9 and 10.

Interposed between the ears of each pair is a rod 16 having its ends anchored to the ears in the manner shown at 17. Slidably disposed on each rod 16 is a cam member generally referred to by numeral 18 and which consists in construction of a sheet of material having one side thereof provided with a diagonal face 19 and a face 20, on a plane at right angles to the longitudinal axis of the rod 16. The lower portion of the cam 18 is cut away as at 21 and provided with a longitudinally extending rib 22, in parallel disposition with respect to the rod 16. A T-shaped operating lever, generally referred to by numeral 23, has its arm portion 24 bevelled as at 25 and having laterally disposed lugs 26 secured to said bevelled portion in the manner clearly shown in Figure 6.

The portion where the handle 27 merges with the arm 24 is enlarged as at 28. A conductor strip 29 is secured along the arm 24 and has a headed member 30 secured at each end. The intermediate portion of the conductor strip 29 is enlarged as at 31 for disposition upon the enlarged portion 28 of the control lever. These enlarged portions are provided with registering openings to receive a bolt 32 for pivotally connecting the control lever to the casing 6. The handle 27 has a rib 33 engageable with the notches 14 in the casing 6. Springs 34 are interposed between the lugs 15 and the cams 18 for maintaining the cams with their surfaces 20 tensionally in contact with the lug 26 on the arms of the control lever 23.

By referring to Figure 3, in conjunction with Figure 15, the connection of the switch with the lamp and source of current, as well as the operation thereof can be readily followed.

The "left" and "right" signal bulbs (see Figure 15) are connected to the contacts 9 and 10 respectively. The conductor portion of the control lever 23 is connected by the conductor 25 to the tell-tale lamp 36, (shown in Figures 15 and 3) and from there to the positive side of the battery 37, which battery has its opposite side grounded (see Figure 15). The various wires are led through the tube 5 and connect to the elements in the manner shown in Figure 3.

When the handle 27 is moved toward the right, that is, when making a right turn, the contact pin will be engaged by the corresponding headed element 30 on the control lever 23, while the opposite arm of the lever forces its corresponding cam member 18 along the rod 16, the lug 26 on the arm alone engaging the cam and only the surface 20 thereof. This movement of the cam takes place against the action of the corresponding coiled spring 34 and obviously by the engagement of the rib 33 on the handle 27 with one of the notches 14 of the casing 6, the control lever will remain in this set position, closing the circuit with the "right" signal lamp.

During the turning motion of the steering apparatus, the casing 6 remains stationary and a pin 38 projecting upwardly from the steering wheel will ride against the rib 22 of the cam member under discussion and will rotate the same to the dotted line position shown in Figure 8, before the pin 38 will ride past the cam.

This will not alter the position of the control lever. However, on the return movement of the steering wheel, the pin 38 will engage the rib 22 and rotate the same in the inverse direction, resulting in the engagement of the diagonal surface 19 against the lug 26 on the control lever. This will exert a slight pressure against the arm 24, sufficient enough to trip the same. The spring 34 connected to this particular cam will then return the control lever to its original position, thus breaking the signal circuit automatically.

While the foregoing description has been in detail, it is to be understood that numerous changes in the specific shape, size and materials may be resorted to, without departing from the spirit and scope of the invention as claimed hereinafter.

What is claimed as new is:

A switch mechanism comprising a pair of relatively spaced fixed contacts, a switch arm pivotally mounted for movement into engagement with either contact, a handle for the said switch arm having a locking lug, a locking element over which the said handle is movable and having notches in which the said lug is adapted to be seated for retaining the switch arm in engagement with one of said fixed contacts, guide rods adjacent each contact, cams slidably and rotatably mounted on the rods, means tensionally engaging the cams with the switch arm or on opposite sides of the pivot to normally thrust the arm in the direction of the contacts, each of said cams being provided at right angles to the axis of rotation and adjacent its upper edge with a perpendicular bearing face normally engaged with the switch arms and having an obliquely disposed bearing face below the said perpendicular face, a rib depending from the cams in parallelism with the axis rod thereof, and a rotatable member having a pin adapted to engage the rib of a cam upon rotation of the member in a predetermined direction for rotating the cam to dispose the oblique face in lifting engagement with said switch arm whereby to disengage the locking lug of the arm from the notch locking element.

In testimony whereof I affix my signature.
JOHN RALPH HAINES.